United States Patent
Mulla et al.

[11] Patent Number: 6,119,944
[45] Date of Patent: *Sep. 19, 2000

[54] DOWN-LOADABLE HAND-HELD OPTICAL READER

[75] Inventors: Altaf Mulla, Merrick; Robert Sanders, Bayport, both of N.Y.; John Lert, Jr., Westport, Conn.; Joseph Katz, Stony Brook, N.Y.; Chinh Tan, Centereach, N.Y.; Ed Barkan, Miller Place, N.Y.; Howard Shepard, Great River, N.Y.

[73] Assignee: Symbol Technologies, Inc., Holtsville, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/794,782

[22] Filed: Feb. 3, 1997

[51] Int. Cl.[7] .................................................. G06K 7/10
[52] U.S. Cl. ............................ 235/472.03; 235/472.02; 235/462.49; 235/462.43; 235/462.46; 348/552; 382/314
[58] Field of Search ..................... 235/472.01, 472.03, 235/462.49, 462.48, 454, 462.41, 385, 383, 375, 462.45, 462.01, 462.3, 462.43, 462.44, 462.46, 472.02; 348/552; 358/478; 382/183, 313, 314

[56] References Cited

U.S. PATENT DOCUMENTS

| | | |
|---|---|---|
| 3,836,755 | 9/1974 | Ehrat .................................... 235/383 |
| 4,207,695 | 6/1980 | Penza, Jr. ................................ 40/334 |
| 4,251,798 | 2/1981 | Swartz et al. . |
| 4,369,361 | 1/1983 | Swartz et al. . |
| 4,387,297 | 6/1983 | Swartz et al. . |
| 4,409,470 | 10/1983 | Shepard et al. . |
| 4,423,319 | 12/1983 | Jacobsen ............................. 235/472.03 |
| 4,460,120 | 7/1984 | Shepard et al. . |
| 4,465,926 | 8/1984 | Apitz et al. . |
| 4,471,218 | 9/1984 | Culp . |
| 4,673,805 | 6/1987 | Shepard et al. . |
| 4,721,849 | 1/1988 | Davis et al. . |
| 4,727,245 | 2/1988 | Dobbins et al. . |

(List continued on next page.)

FOREIGN PATENT DOCUMENTS

| | | |
|---|---|---|
| 60-46667 | 3/1985 | Japan . |
| 2312188 | 10/1997 | United Kingdom . |

OTHER PUBLICATIONS

IBM Technical Disclosure Bulletin, Distributing Uniform Resource Locators as Bar Code Images, vol. 39, No. 1, p. 167 XP000556360, (Jan. 1996).

Hahn, M., Uniform Resource Locators, EDPACS, vol. 23, No. 6, pp. 8–13, XP000602353, (1995).

Shrikumar, H. et al., Thinternet: Life At The End Of A Tether, Computer Networks and ISDN Systems, vol. 27, No. 3, pp. 375–385 XP004037970, (Dec. 1994).

Schlit, B.N., et al., Teleweb: Loosely Connected Access to the World Wide Web, Computer Network and ISDN Systems, vol. 28, No. 11, pp. 1431–1444 XP004018240, (May 1996).

Datawand IIB/III Product Specifications, Symbol Technologies, Inc., (Mar. 1995).

*Primary Examiner*—Donald Hajec
*Assistant Examiner*—Diane I. Lee
*Attorney, Agent, or Firm*—Kirschstein, et al.

[57] ABSTRACT

A hand-held bar code reader, in particular a bar code wand is used by a consumer to read bar code information accompanying a product displayed at a retail outlet. The bar code information can be presented in, for example, UPC format and carries information relating to the products. The consumer subsequently down-loads information stored in the reader via a suitable interface to a personal computer which accesses information identified by a address included in or comprising the bar code information. The site contains additional information such as price information concerning the advertised product and the consumer may be able to pay for and order the product directly via the site. As a result the consumer has a simple reminder of the product, is able to obtain additional information concerning the product with minimum difficulty and can obtain the product itself with maximum ease.

34 Claims, 11 Drawing Sheets

U.S. PATENT DOCUMENTS

| | | |
|---|---|---|
| 4,736,095 | 4/1988 | Shepard et al. . |
| 4,748,318 | 5/1988 | Bearden et al. .................. 235/462.49 |
| 4,758,717 | 7/1988 | Shepard et al. . |
| 4,833,308 | 5/1989 | Humble ................................. 235/383 |
| 4,835,372 | 5/1989 | Gombrich et al. ................ 235/462.15 |
| 4,841,132 | 6/1989 | Kajitani et al. . |
| 4,857,713 | 8/1989 | Brown ................................. 235/472 |
| 4,879,540 | 11/1989 | Ushikubo ......................... 235/462.13 |
| 4,889,977 | 12/1989 | Haydon ............................... 235/472 |
| 4,916,441 | 4/1990 | Gombrich . |
| 4,924,171 | 5/1990 | Baba et al. . |
| 4,933,538 | 6/1990 | Heiman et al. . |
| 4,964,167 | 10/1990 | Kunizawa et al. ...................... 704/260 |
| 5,047,615 | 9/1991 | Fukumoto et al. . |
| 5,060,152 | 10/1991 | Maeser et al. . |
| 5,065,003 | 11/1991 | Wakatsuki et al. ............... 235/472.02 |
| 5,105,071 | 4/1992 | Tashiro et al. .................... 235/472.02 |
| 5,117,098 | 5/1992 | Swartz ................................ 235/462.21 |
| 5,142,161 | 8/1992 | Brackmann .................... 235/472.03 X |
| 5,159,321 | 10/1992 | Masaki et al. ......................... 340/706 |
| 5,189,291 | 2/1993 | Semiatkowski . |
| 5,193,897 | 3/1993 | Halsey ................................... 362/118 |
| 5,198,644 | 3/1993 | Pfeiffer et al. ......................... 235/472 |
| 5,231,278 | 7/1993 | Kuo .................................. 235/472.03 |
| 5,247,137 | 9/1993 | Epperson ................................ 178/18 |
| 5,250,789 | 10/1993 | Johnsen ................................ 235/383 |
| 5,256,866 | 10/1993 | Conversano et al. .............. 235/472.03 |
| 5,294,792 | 3/1994 | Lewis et al. ............................ 250/221 |
| 5,307,253 | 4/1994 | Jehn ........................................ 362/259 |
| 5,331,547 | 7/1994 | Laszlo ............................... 364/413.01 |
| 5,361,871 | 11/1994 | Gupta et al. ............................. 235/383 |
| 5,369,262 | 11/1994 | Dvorkis et al. ......................... 235/440 |
| 5,465,038 | 11/1995 | Register ............................. 235/375 X |
| 5,465,207 | 11/1995 | Boatwright et al. .............. 364/424.05 |
| 5,468,947 | 11/1995 | Danielson et al. . |
| 5,483,052 | 1/1996 | Smith, III et al. ................. 235/462.49 |
| 5,506,394 | 4/1996 | Plesko ................................ 235/462.46 |
| 5,541,398 | 7/1996 | Hanson ................................. 235/472 |
| 5,574,804 | 11/1996 | Olschafskie et al. .............. 235/472.03 |
| 5,621,203 | 4/1997 | Swartz et al. ...................... 235/462.11 |
| 5,640,002 | 6/1997 | Ruppert et al. .................... 235/462.46 |
| 5,640,193 | 6/1997 | Wellner ...................................... 348/7 |
| 5,652,412 | 7/1997 | Lazzouni et al. .................. 235/456 X |
| 5,696,496 | 12/1997 | Kumar .............................. 340/825.25 |
| 5,774,602 | 6/1998 | Taguchi et al. ......................... 382/314 |

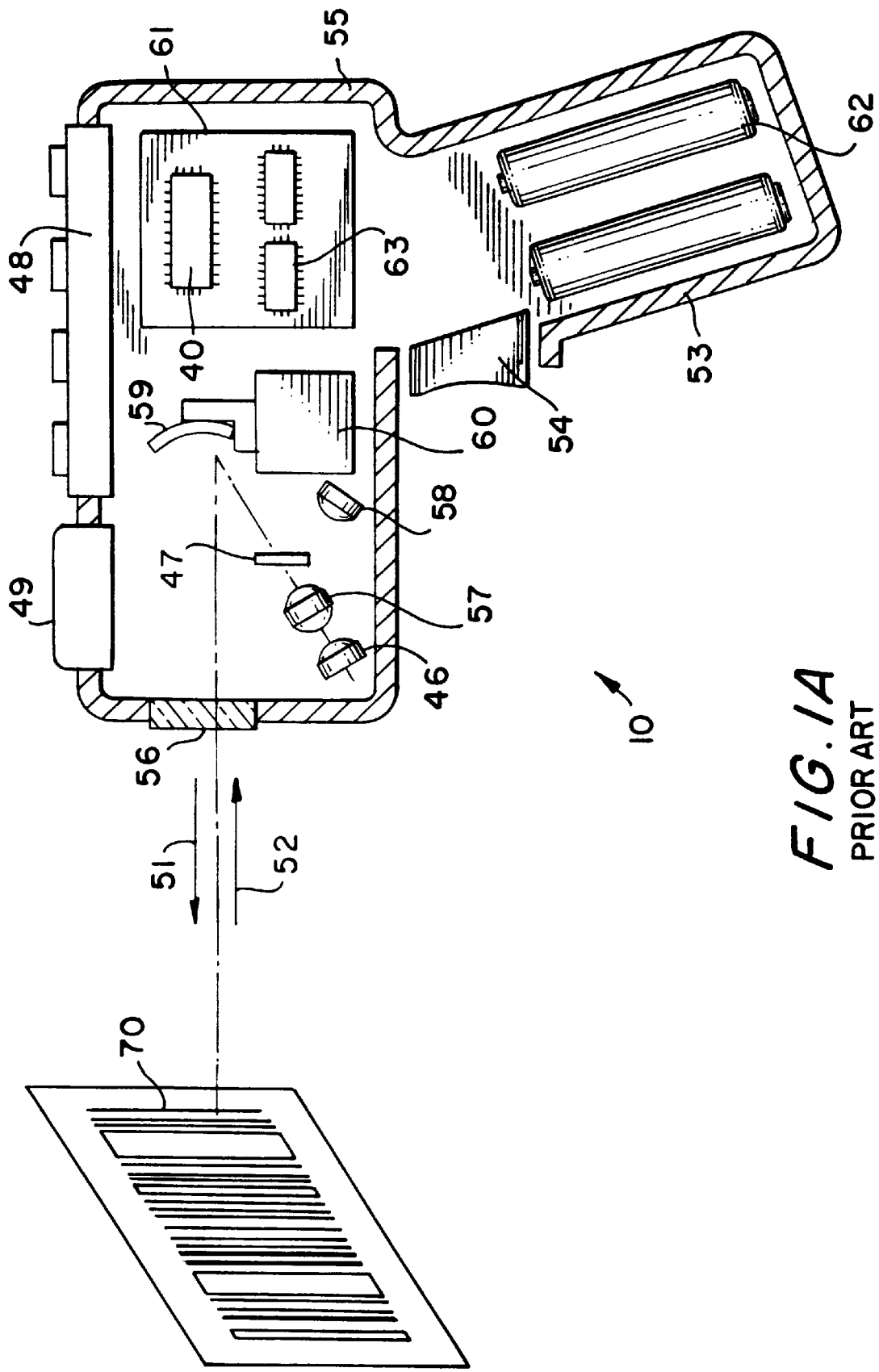
FIG. IA
PRIOR ART

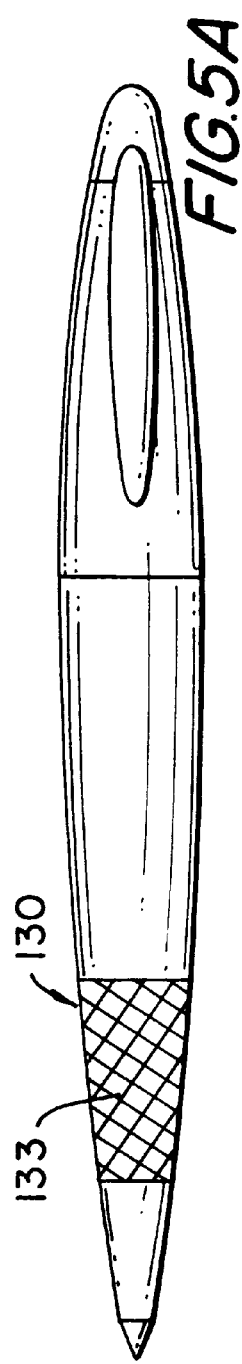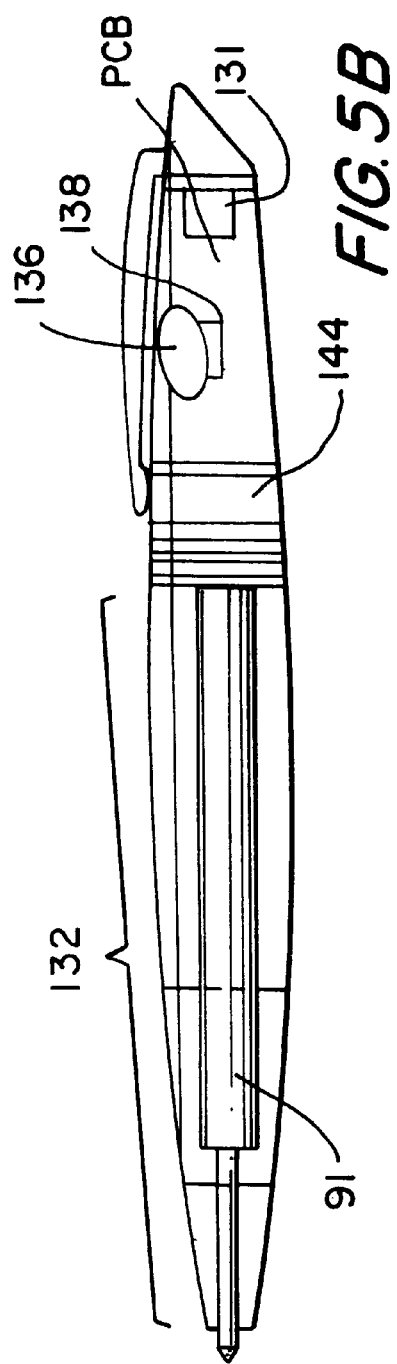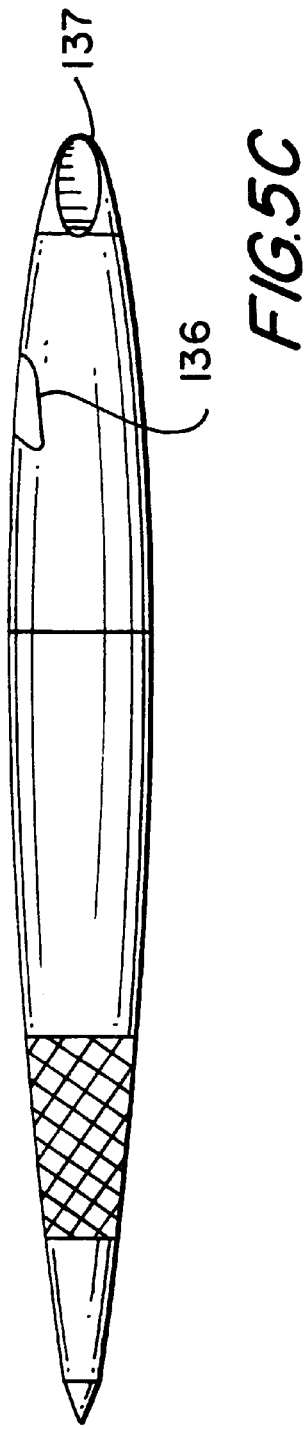

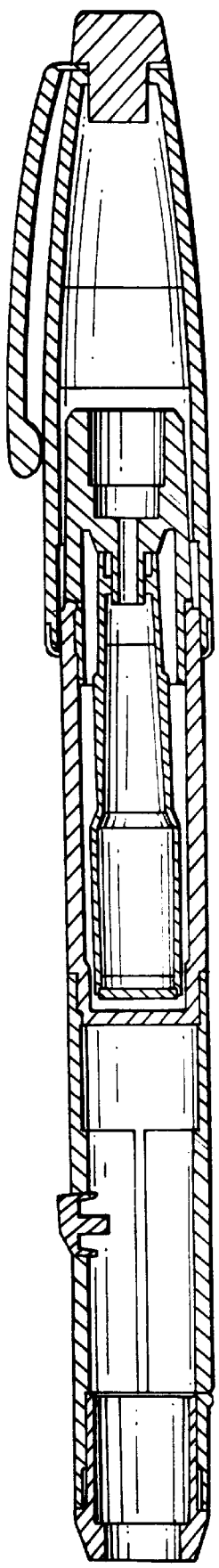
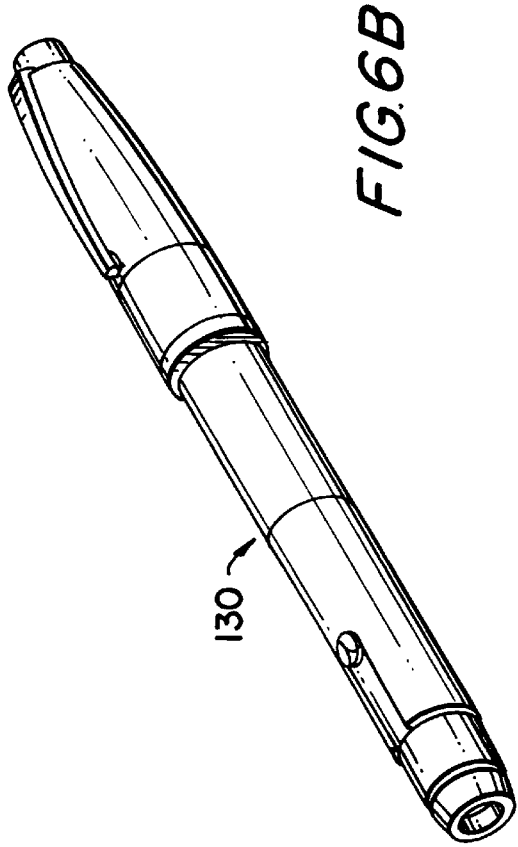
FIG.6A
FIG.6B

DOWN-LOADABLE HAND-HELD OPTICAL READER

BACKGROUND OF THE INVENTION

1. Field of the Invention

The invention relates to an optical reader in hand-held form, for example in the form of a wand or pen, and in particular to such a reader capable of downloading information to a data processing device and a method of retrieving data, for example from the wand or pen. The reader may also incorporate a writing instrument.

2. Description of the Related Art

Electro-optical readers, such as bar code symbol readers, are now quite common. Typically, a bar code symbol comprises one or more rows of light and dark regions, typically in the form of rectangles. The widths of the dark regions, i.e., the bars, and/or the widths of the light regions, i.e., the spaces, between the bars indicate encoded information to be read.

A bar code symbol reader illuminates the symbol and senses light reflected from the coded regions to detect the widths and spacings of the coded regions and derive the encoded information. Bar code reading type data input systems improve the efficiency and accuracy of data input for a wide variety of applications. The ease of data input in such systems facilitates more frequent and detailed data input, for example to provide efficient inventories, tracking of work in progress, etc. To achieve these advantages, however, users must be willing to consistently use the readers. The readers therefore must be easy and convenient to operate.

As illustrated in FIG. 1a a bar code symbol 2 consists of a series of light and dark regions 4,6, typically in the form of rectangles. The widths of the dark regions 6, the bars, and/or the widths of the light spaces 4 between the bars indicate the encoded information. A specified number and arrangement of these elements represent a character. Standardized encoding schemes specify the arrangements for each character, the acceptable widths and spacings of the elements, the number of characters a symbol may contain or whether symbol length is variable, etc. The known symbologies include, for example, UPC/EAN, Code 128, Codabar, and Interleaved 2 of 5.

To decode a bar code symbol and extract a legitimate message, a bar code reader illuminates the bar code and senses the light reflected therefrom to detect the widths and spacings of the bar code and produces an electrical signal corresponding to the scanned bar code. This electrical signal is decoded to provide multiple alphanumerical characters which are descriptive of the article to which the bar code is attached or to some characteristic thereof. Such characters are typically represented in digital form as an input to a data processing system for applications in point-of-sale processing, inventory control, and the like.

There are several different types of bar code readers. A first type, a wand 8, contains an emitter 10 and a detector 12, and the user manually moves the wand across the bar code. The detector 12 senses the light reflected from a spot scanned by the wand 8 across the bar code 2, and produces an electrical signal representing the encoded information to processor means 14. Wands have been disclosed, for example in U.S. Pat. Nos. 4,654,482, 4, 907,264 and 4,937, 853.

A document of particular relevance is U.S. Pat. No. 4,471,218 which discloses a data wand and a data well, and is incorporated herein by reference. According to the specification a wand-type data entry terminal is entirely self-contained and cordless, and includes reading and storage circuitry. The terminal further allows down-loading of the interface using an optically coupled link. Preferably the stored data is output using a pulsed beam from the reading beam light source. The output beam is detected by an optical detector and decoded appropriately.

The discloses of the above mentioned references are incorporated herein by reference. The general features of construction and operation of a wand type reader will be apparent to the skilled reader.

According to another system described in U.S. application Ser. No. 08/691,263, filed Aug. 2, 1996, commonly assigned herewith, a hand-held optical reader terminal is provided having an ergonomic design. According to that system there is provided, inter alia, a hand-held optical reader arranged to fit in the hand of a user and including a reader component and a down-loading component. The device can include a display screen and a display screen for displaying control messages or video images, a keypad for inputting control or other data and a wireless communication link for down-loading data read by the reader component to an external device. The system can further include a plurality of inter-changeable data collection modules connectable to the main body of the device, each module fulfilling a different function such as image/video capture, audio capture and so forth. As a result a simple multi-media module is provided.

It is desired, however, to arrive at a light weight hand-held data reader having a yet wider range of capabilities.

In view of the relative simplicity, availability and adaptability of information systems including bar code symbol data storage capability, it is desirable to develop systems particularly suitable for consumer applications. A wand-type optical reader which has many consumer applications is shown in FIG. 1b. The arrangement, generally designated as 80 comprises a pen-shaped main body 81 having at its writing end an optical scanner element light emitter and detector 82 for reading a bar code symbol illustrated schematically as 83. The pen may also include actual writing capability, for example by having the writing nib adjacent the optical element 82 or, indeed, having the writing element and the optical element 82 at opposing ends. It is desired to increase the range of applications for such a product. The data processing capabilities of such a system 80 are limited by its physical size and power supply potential consequently limiting the range of applications of the arrangement. In addition various problems arise in actual operation of such a system, in particular in regulating the varying speeds at which consumers scan a given bar code symbol 83.

SUMMARY OF THE INVENTION

Objects of the Invention

An object of the present invention is to avoid or mitigate the problems associated with previous systems.

A further object of the invention is to provide a data reader usable in conjunction with the Internet computer network, or comparable closed computer network such as an Intranet, LAN and so forth.

A particular object is to widen the range of applications of known systems despite the limited processing and data storage capabilities of existing hand-held optical readers, in particular of the pen type.

It is yet a further object of the invention to compensate for the varying speeds at which users scan the reader across a given bar code.

FEATURES OF THE INVENTION

According to the invention there is provided a product information retrieval system for use in conjunction with the Internet computer network, wherein product information relating to a selected product is accessible at an Internet site having an Internet Protocol site address, wherein the site address is directly or indirectly represented by a machine-readable printed indicia, and wherein a hand-held reader is provided for reading the indicia, storing the site address represented thereby and down-loading the site address to a client processor for accessing the product information at the site address. The product may comprise a commercial product. The commercial product may be displayed on printed matter, the machine-readable indicia being printed in association therewith. Alternatively the commercial product may be displayed at a retail outlet and the machine readable indicia may be printed on the product or product packaging.

The machine-readable printed indicia may comprise a bar code symbol. The hand-held reader may comprise a bar code reader, for example a field of view optical reader, such as a "wand" type optical reader.

The bar code symbol may be printed in one of the group of formats comprising: UPC, EAN.

The data in the bar code symbol may represent the a site address, or may simply be a product code which can be utilized to look up a corresponding site address in a table, and the site address may be converted into a (Uniform Resource Locator) at the client processor.

According to the invention there is further provided a "wand" type hand-held optical reader comprising reading means for reading a printed indicia and data storage means for storing the data represented by the printed indicia, arranged to read the printed indicia associated with a selected product, the reader further having a down-loading port for down-loading the stored data to a client processor to retrieve additional data relating to the product.

The client processor may be linked to the Internet computer network and the printed indicia may contain an Internet Protocol site address corresponding to a site containing additional information relating to the product. Accordingly the system requires no more than standard address protocols. The reader may comprise a bar code reader.

According to the invention there is further provided a method of retrieving product information wherein the product information is stored at an Internet computer network site having an Internet Protocol site address, and the site address is represented in the form of a machine-readable printed indicia, comprising the steps of reading the printed indicia using a hand-held reader, storing the site address data represented by the indicia in the storage means in the hand-held reader, down-loading the site address data from the hand-held reader to a client processor linked to the Internet and accessing the Internet site identified by the site address.

The product may be a commercial product. The printed indicia may accompany a representation of the product in printed matter or the product may be displayed at a retail outlet, the indicia being printed on the product or its packaging.

According to the invention there is further provided a product information retrieval system for use in conjunction with a closed computer network whereby product information relating to a selected product is accessible at a site on the network having a site address, wherein the site address is represented by a printed indicia, a hand-held reader is provided for reading the indicia, storing the address data represented thereby and down-loading the address data to a client processor on the network for accessing the product information at the site address. The network may comprise an LAN. The network may comprise an Intranet system. The client processor may comprise a network computer.

According to the invention there is further provided a product information retrieval system for use in conjunction with a computer network, whereby product information relating to a selected product is accessible at a network site having a site address, wherein the site address is represented as a printed indicia, a hand-held reader is provided for reading the indicia, storing the site address data represented thereby and down-loading the site address data to a terminal linked to the network, wherein the terminal comprises data input, output and display means and outputs to the site address data to a host computer, and the host computer accesses the network site for input to and display at the terminal.

The terminal may comprise a network computer. The network may comprise the Internet or the network may comprise an Intranet or the network may comprise an LAN.

According to the invention there is further provided a method of retrieving product information stored at a site on a computer network having a site address, wherein the site address is represented as a printed indicia, the printed indicia is read by a hand-held reader, the site address data represented thereby is stored in the hand-held reader and down-loaded to a terminal linked to the computer network, the terminal comprising data input, output and display means, and wherein the site address data is output from the terminal to a host computer, and the host computer accesses and inputs to the terminal the corresponding network site, the terminal displaying the product information contained at the site address.

The data terminal may comprise only a display means, data input/output means and data transfer means. The network may comprise an Intranet network. The network may comprise a local area network.

According to the invention there is further provided a method of retrieving data comprising reading identification information stored as printed indicia using a stand-alone reader, storing the identification information in a data storage device provided in the reader, transferring the stored identification information from the data storage device to an access point to a data storage and retrieval system, and retrieving stored data from the system identified by the identification information.

In the preferred embodiments the identification information is used to access an Internet site relating to the product. In that case, for example, a product in a magazine carries an accompanying bar code symbol, the bar code symbol containing the Internet Protocol site address at which further information concerning the product can be found. The Internet site can be a web site. The user stores the site address and down-loads it to a PC or other access point subsequently, allowing the Internet site home page or sub-page to be called up and additional product information accessed. In addition, as discussed in more detail below, the product can be purchased, or the user can be directed to related products.

As a result, information can be stored when the user does not have access to the data storage and retrieval system itself. The stored data can act as a reminder or prompt to the user. A particular application is where the identification information relates to a product represented in printed matter in which case further details can be retrieved subsequently and in many cases a direct transaction carried out interacting only with the data storage and retrieval system.

The stand-alone reader may be a hand-held reader. The printed indicia may comprise a bar code symbol and the stand-alone reader may comprise a wand-type bar code reader. The identification information may relate to a selected product and the retrieved data may comprise additional information concerning the product. The access point may comprise an interface to a personal computer or a dedicated down-loading port. The latter allows use of the invention even where the user does not have access to a PC.

The identification information may be transferred via a touch memory interface. The data storage and retrieval system may comprise the, the identification information may comprise a web site address and the retrieved data may be held at the web site. Alternatively the data storage and retrieval system may comprise a closed computer network such as an Intranet or LAN. In that case the identification information may comprise an appropriate site or database location address conforming with the protocol adopted by the Intranet or LAN. The reader data storage device may store data relating to the reader user, and the reader user information may be transferred together with the stored identification information to the data storage and retrieval system. This assists in further transactions such as purchase and allows a customer profile to be assembled.

According to the invention there is further provided a hand-held reader for reading printed indicia comprising reading beam generating means for generating a reading beam to be reflected by a printed indicia, a first reading beam detection zone to detect a reading beam reflected by a printed indicia and a second reading beam detection zone spaced from the first detection zone. The readings taken at each zone can be compared to establish the scanning speed and variations therein.

The reader may further comprise a third reading beam detection zone spaced from the first and second zones and located such that the three zones are provided at the corners of a nominal triangle. In addition, therefore, orientation information can be derived.

The first and second detection zones may comprise arcuate zone provided either side of a principal detector for reading the printed indicia.

According to the invention there is further provided a method of reading a printed indicia using a hand-held reader having first and second reading beam detection zones spaced from one another in which the readings in the time domain for each associated zone are compared, the respective times at which an identified point on the printed indicia is read in at each zone recorded and the speed of the reader passing that point calculated accordingly. First, second and third detection zones may be provided at notional corners of a triangle and the speed and orientation of the reader calculated accordingly. The given point on a printed indicia may comprise a transition point between areas of differing reflectivity.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings. Further features of the invention are set out in the appended independent claims, and further preferred features are set out in the dependent claims.

BRIEF DESCRIPTION OF THE DRAWINGS

FIG. 1a is a schematic view of a prior art hand-held laser scanner and data collection terminal;

FIG. 4b shows in more detail the principal components of the pen-type optical reader shown in FIG. 4a;

FIG. 5a shows a further alternative pen-type optical reader;

FIG. 5b shows in more detail the principal components of the pen-type optical reader of FIG. 5a;

FIG. 5c is a view of the pen-type optical reader of FIG. 5a from a different angle;

FIG. 6a is a sectional view of an alternative pen-type optical reader;

FIG. 6 is a perspective view of the pen-type optical reader of FIG. 6a;

DETAILED DESCRIPTION OF THE PREFERRED EMBODIMENTS

As used in this specification and in the appended claims, the term "indicia" broadly encompasses not only symbol patterns composed of alternating bars and spaces of various widths commonly referred to as bar code symbols, but also another one or two dimensional graphic patterns, as well as alphanumeric characters. In general, the term "indicia" may apply to any type of pattern or information which may be recognized or identified by scanning a light beam and detecting reflected or scattered light as a representation of variations in light reflectivity at various points of the pattern or information. A bar code symbol is one example of an "indicia" which the present invention can scan.

Figure 1B:
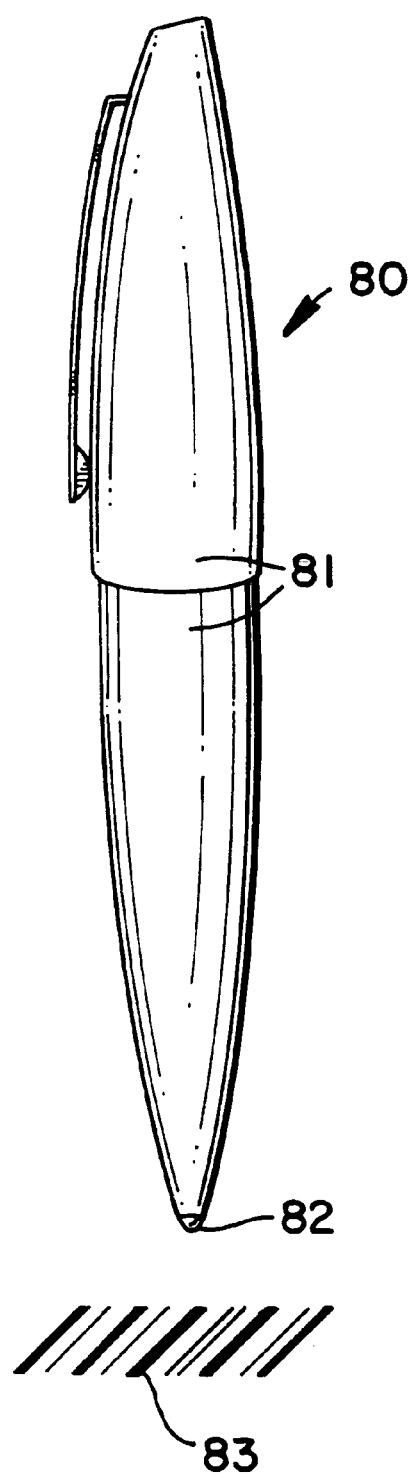
FIG. 1b shows a hand-held pen-type optical reader.
Figure 2:
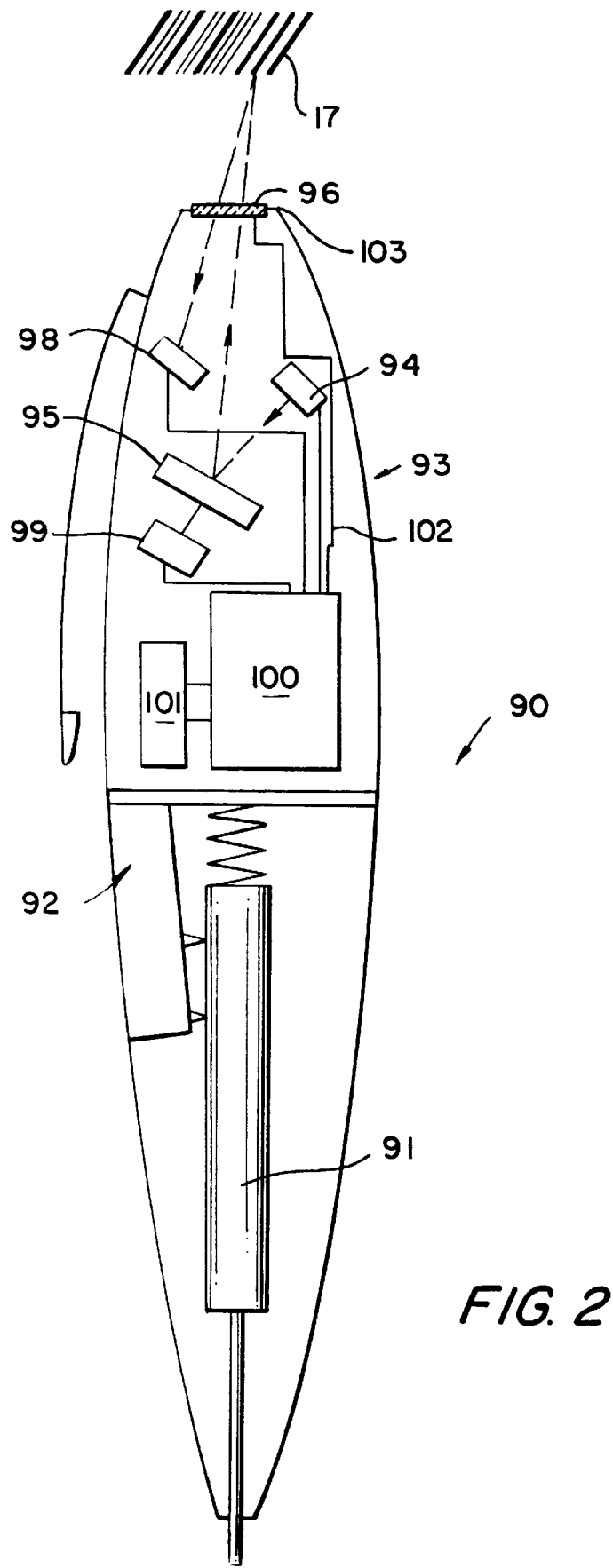
FIG. 2 shows the principal components of a pen-type optical reader.

An embodiment of an optical reader to be used in conjunction with the present invention is shown in FIG. 2. Although a pen-type optical reader (often known as a "data wand") is shown it will be appreciated that any other hand-held configuration would be appropriate for use in conjunction with the present invention. Although specific constructional details are also discussed in more detail below, it will be appreciated that data storage/processing elements and optical reader elements of known type can replace the specific components discussed in a manner that would be well known to the skilled man. A discussion of pen-type readers is found in U.S. Pat. No. 5,506,392, commonly assigned herewith and incorporated herein by reference.

The pen-type optical reader (henceforth referred to as a "wand reader") is generally referenced 90 in FIG. 2. It will be appreciated that the exact shape of the wand reader as illustrated 90 may be exaggerated, for example in width, in order to show more clearly each of the principal components and how they interact. In the embodiment shown, the wand reader 90 comprises a ball-point pen 91,92 together with the optical reader 93 itself. The wand reader need not actually have writing capability, or may be in the form of any suitable writing implement such as a pencil, a fountain pen, a marker pen and so forth. Indeed the optical reader sub-system discussed in more detail below can be in a modular form insertable into a suitably configured writing implement housing of any desired type.

The writing element of the wand reader 90 is shown schematically as a ball-point pen cartridge 91 together with a projection/retraction mechanism generally designated 92 and of any suitable known type. Evidently it is desirable to reduce the size of those elements 91,92 as far as possible to allow maximum space for the reader module.

The reader module is generally designated 93. The components and construction of the module 93 will be generally well known to the skilled man and are described only briefly hereafter for the purposes of completeness. The reader module 93 includes a light source 94, for example, a laser or LED and a reflector 95. A reading beam generated by the light source 94 is reflected by the reflector 95 out of a reading window 96. The reading beam is reflected by a bar code symbol generally designated as 97, passes once more through the reading window 96 and is received by a detector 98. Preferably the reader module 93 is a field of view reader in which case the mirror 95 is a fixed mirror and the detector 98 comprises a CCD (charge coupled device) array. Of course in certain implementations a scanning system may be used in which case reflector 95 is driven by a motor schematically shown at 99 for scanning motion. The light source 94, detector 95 and, if appropriate, motor 99 are connected to a processor, control and data storage element 100 in conjunction with a power source 101. The processor element 100 controls operation of the various components and also acts as a data storage and processing device for bar code information read by the module 93. As discussed in more detail below, it is desired to down-load the information stored in processor element 100 at a later stage to an external device. Accordingly a data output port 103 is provided fed by line 102, preferably adjacent to or in conjunction with the reading window 96. The wand reader 90 may also be used as a laser pointer in one embodiment, wherein the output reading beam is used to highlight desired elements during a presentation.

Figure 3:
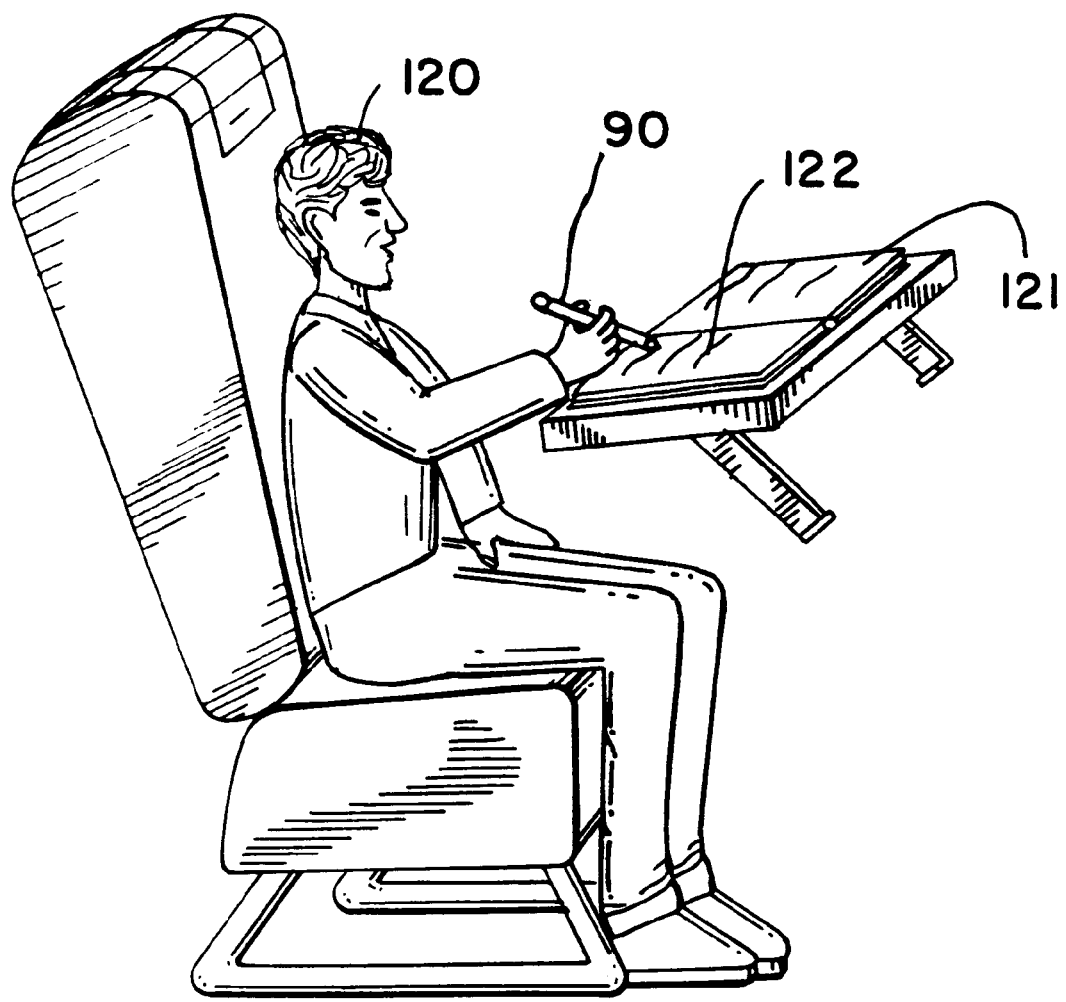
FIG. 3a demonstrates a use of the pen-type optical reader according to one embodiment of the invention.
FIG. 3b demonstrates a use of the pen-type optical reader according to an alternative embodiment of the invention.

A particular implementation proposed according to the present invention for the wand reader 90 occurs in relation to consumer information access as shown in FIG. 3a. For example where a consumer 120 carries a wand reader 90 and is in a retail outlet selling products 121, each of those products may carry a bar code symbol 122 for example in UPC format. The consumer 120 may be interested in purchasing the product 121 but may not be willing to commit until further information is available. There exists, therefore, a risk that the consumer will forget about the product or, as previously, it may be necessary to rely on a consumer 120 chancing upon the product or additional information relating to the product, and his memory being jogged accordingly.

According to the present invention, however, the consumer 120 can read the bar code symbol 122 using wand reader 90. The bar code information is stored in the processing element 100 and, to the extent desired, processed. In particular, information contained in the bar code symbol 122 relating to the product 121 is stored. As a result the consumer has an automatic reminder of the product he wishes to purchase as well as information relating to the product. Evidently, where the consumer 120 sees more than one product of interest, the relevant information can also be stored, the storage capabilities of the wand reader 90 being limited only by the storage space in the processor element 100.

A particular implementation of the present invention allows the consumer to subsequently down-load the information stored in the wand reader 90 in a manner described in more detail below. In particular the information can be down-loaded to a personal computer or other access point to a computer or data network. The down-loaded information can then be used in various different manners. For example the product can be ordered or additional information concerning the product can be accessed. A particular implementation proposed under the present invention is that the bar code symbol accompanying the product contains sufficient information for the personal computer or access point to the computer network to access a site on the ad (or comparable data storage system). This site can contain additional information concerning the product, information concerning related products, price information, cross-references to further related sites, and the capability of ordering and paying for the product. This greatly simplifies the purchasing process, allowing for example a price check and also ensures that the consumer does not forget a product which has caught his attention.

In addition, further information can be derived according to the present invention. For example the popularity of the product can be assessed for future marketing purposes. Preferably the reader wand 90 has a dedicated user and carries user identification information such as credit card number, or other identification carried under an approved system. As a result, during purchase of the product details of the transaction can be based on that information. In addition a customer profile can be built up based on the consumer's buying patterns.

The access point can be located within the retail outlet allowing the consumer 120 to access the information on site and make a purchase decision before leaving the retail outlet. Suitable access points are discussed in more detail below. It will be seen that the bar code symbol can be carried on the product, or as shown at 123 on the shelf adjacent the product. Alternatively the products could be displayed graphically on a chart and the bar code symbol shown on or adjacent the product on the chart.

It will be seen that the system can be extended to other applications. For example where an abstract of text is printed together with a bar code symbol, the bar code symbol can contain information which, when down-loaded, can provide access to additional or related text. Assuming high enough resolution, the bar code symbol can even be read off a VDU or other visual display system in a closed system in order to access additional information on the Internet. The bar code symbol can follow any appropriate protocol, for example UPC or EAN and is translatable into the Internet Universal Resource Locator (URL).

A further application for the system is described with reference to FIG. 3b. A catalog 278 which shows a product 294 and also includes various data relating to the item number 282, the quantity 284, the color 286, the size 288 and other information 290. In addition bar coded shipping information is stored at 292 and payment method at 293. Such a catalog is of use, for example in home shopping applications. The catalog can also carry a bar code identifying the caller at 280 which information can be used for consumer identification at the purchasing stage. The particular implementation according to the present invention requires suitable down-loadable product information to be stored in the bar code symbols. In particular, the item number 282 can in fact be in the form of a suitable computer network site address. Alternatively the computer network site address can be stored at the other information field 290. The remaining bar code symbols may not be required, as the information can be stored at the site address, but the embodiment shown allows alternative implementations dependent upon the hardware available to the user.

The user scans the wand reader across the site address field and, if necessary, across the user identity field 280 and down-loads the stored information to an Internet (or other computer network) access point. The remaining product information is available at the Internet site and the options such as quantity, color, size, shipping method and payment method can be input at that stage. Accordingly a simple catalog-based home shopping system can be set up. It will be appreciated that such a system can be introduced in various environments, for example when a passenger is in an aeroplane a suitable catalog can be provided. Once again the system allows the consumer to consider carefully what products they should buy on the basis of all available information, and also provides a useful prompt or reminder concerning products which have caught the consumer's eye to which the consumer is not yet committed.

Where the bar code symbol is for use in conjunction with the a or parallel system, the information contained in the bar code symbol effectively comprises an a address. When that information is down-loaded to a personal computer the personal computer communicates with a dedicated server which captures the a address and user identification information and re-routes to the relevant product information site, for example a web site for information retrieval and delivery to the consumer's personal computer. Accordingly, the down-loaded information would enable the PC to go directly to a relevant home page or a relevant sub-page. A resolution server on the system could be used to collect information from all users, not only for information purposes but also for billing and routing purposes.

It will be recognised that alternative systems to the Internet, and alternative access methods are envisaged. For example the Internet could be replaced by an Intranet or a local area network (LAN), accessible by a limited number of users restricted either geographically or by some form of access authorisation. Instead of being down-loadable to a PC which processes the site address information, pulls up the authorization site and displays the product information, alternative access points are envisaged. For example, following a system such as the Citrix (TM) system, the down-loading could be merely an access point or terminal with minimum processing capabilities itself. The terminal transfers the site address information to a host computer which carries out the principal conversion to a URL, accesses the web site and transfers the information back to the terminal for display. In that case the terminal acts as little more than a display and input/output device. It is envisaged, therefore, that the system could embrace the new generation "network computers" working on this principal. The effect of such a system is a considerable change in the architecture of the system allowing reduced costs to the consumer who need only buy the low level terminal for connection with a host computer linked into the main network. As a result the proposed invention is yet further desirable and accessible to the consumer.

Figure 4A:
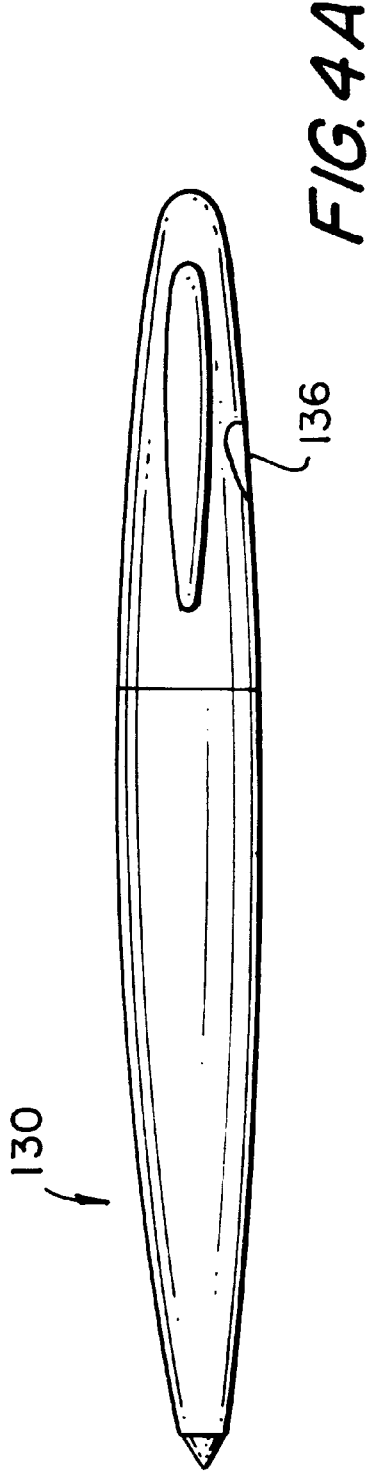
FIG. 4a shows an alternative version of the pen-type optical reader.
Figure 4B:
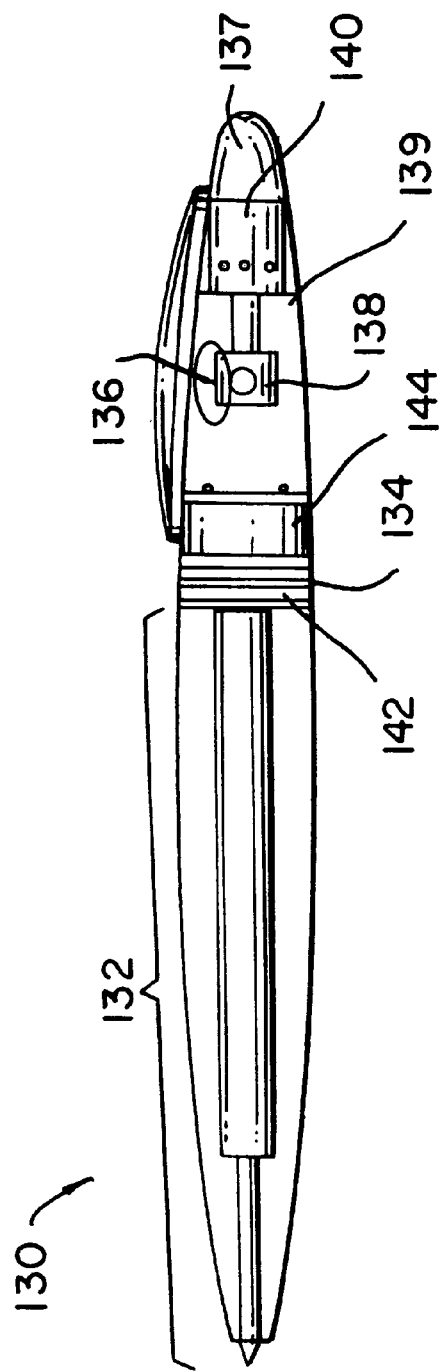

Various alternative wand reader configurations are shown in FIGS. 4 to 6. Referring firstly to FIGS. 4a and 4b a reader wand 130 includes a pen assembly 132 including a ball pen cartridge for example of the type sold under the trade mark Zebra F-refill and an actuating mechanism 134 of a known type rotatable to extend and retract the ball pen cartridge. The wand reader 130 further includes a trigger 136 manually actuable to enable a scan together with a cooperating internal switch 138 under, for example, code ITT KSC 421. The reader wand 130 includes a wand tip 140 for reading a bar code symbol. A data output point is also provided at 137. The system is powered by a battery 142 of any suitable compact type. Also included is a beeper 144 or other audible device which can sound to indicate to the user that a bar code symbol has been successfully read, that the battery power is low, that there is little memory space left and so forth. Different audible tones or sequences of audible tones can represent different warning signals. In addition the wand reader 130 can include a screen (not shown) carrying information as to the status of the wand reader and any instructions for use thereof.

FIGS. 5a to 5c show a slight variant in which, where appropriate, the same reference numerals have been used as for FIG. 4. It will be seen that the exit window for the reader (here shown as a laser scanner at 131) is in an inclined face relative to the longitudinal axis of the reader wand 130, allowing improved ergonomics in reading a bar code symbol. The reader further includes a grip 133, for example made of leather, around a portion of its length allowing improved user grip and comfort.

FIG. 6a and 6b show a further alternative configuration schematically once again using the same reference numerals where appropriate as in FIGS. 4 and 5.

Figure 7A:
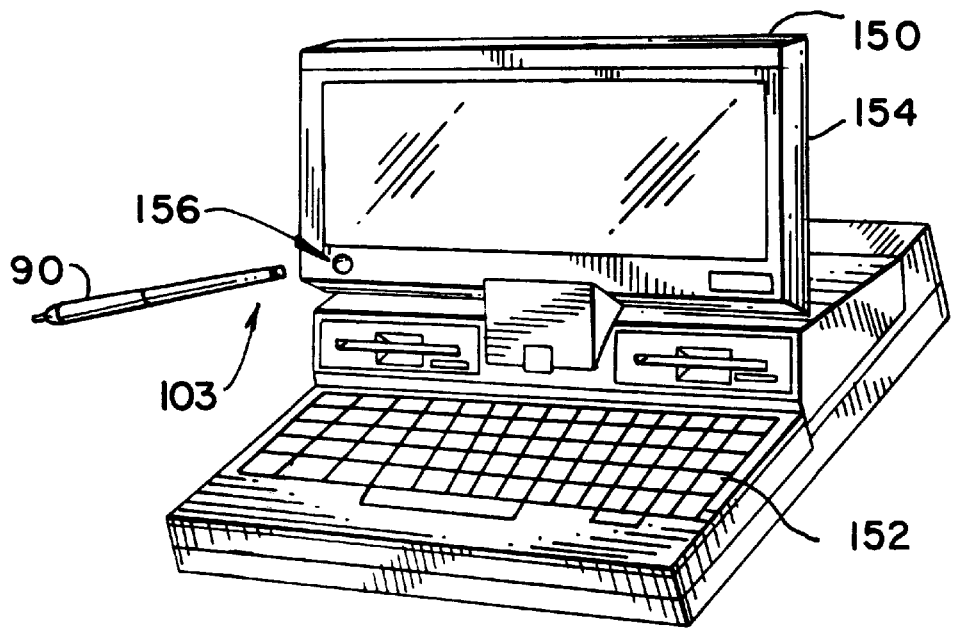
FIG. 7a shows one method of down-loading information from a pen-type optical reader according to the present invention.
Figure 7B:
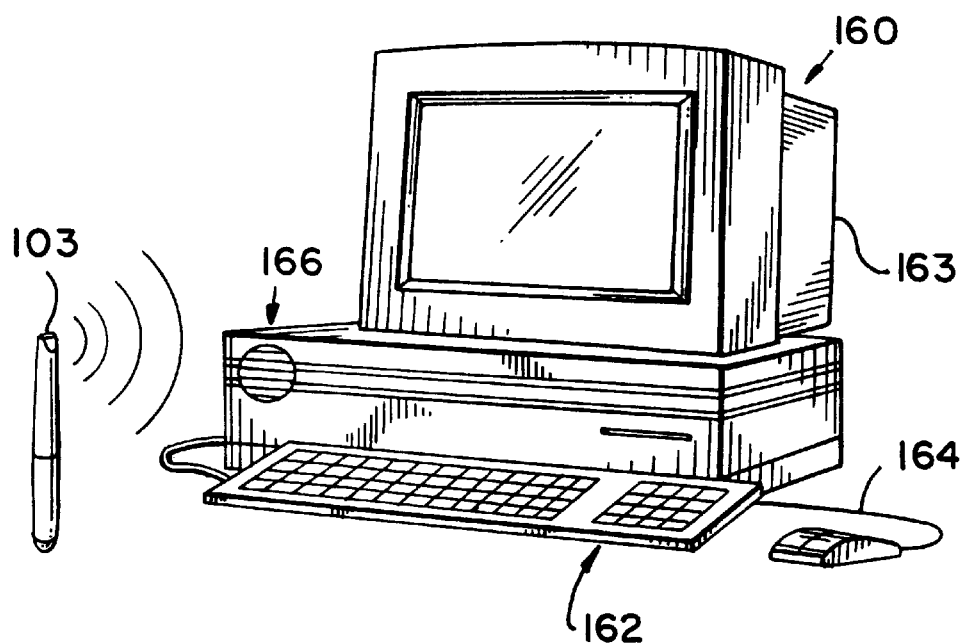
FIG. 7b shows an alternative method of down-loading information from the pen-type optical reader according to the present invention.

Various methods of down-loading the information are contemplated. Two approaches are shown in FIGS. 7a and 7b. In a preferred configuration shown in FIG. 7a a personal computer is shown at 150 being of the portable type although a fixed type PC will also of course suffice. The personal computer 150 includes a keyboard 152 and a screen 154 and can generally be of conventional type. The personal computer 150 includes a data input port 156 arranged to communicate with the wand reader data output port 103. In the embodiment shown, the output port 103 of the wand reader 90 is touched against the data input port 158 on the personal computer 150. Touching the input port 156 firstly commences the down-loading sequence and secondly allows accurate and rapid communication between the wand reader 90 and the personal computer 150. The interface between the wand reader 90 output point 103 and the data input port 156 can, for example, be of the "memory button" or "touch memory" type for example as sold by Dallas Semiconductors. The actual interface is of well known type and in effect the information stored in the wand reader 90 is communicated to a memory button 103 provided at an appropriate point on the wand reader 90. The information is converted to a suitable form for transmission at the memory button 103 and, on contact with the data input port 156 of the personal computer 150 the transmission is activated. The data input port 156 is configured to receive and convert into a suitable form information transferred from the memory button 103. In particular the information can be transferred in the form of a series of electronic pulses representing bits. Such a system gives rise to a simple and substantially error-free interface allowing a user to down-load information stored in a reader wand 90 to a personal computer 160 quickly and accurately.

As will be appreciated, various other down-loading methods are contemplated within the ambit of the present invention. For example as shown in FIG. 7b a fixed-type personal computer 160 including a keyboard 162, a display screen 163 and a mouse 164 includes a microphone 166 which receives an audio signal from a corresponding speaker data output 168 on a reader wand 90. A button (not shown) or other switch can be included on the reader wand 90 to activate transmission by the speaker 168. The information stored in the reader wand 90 is converted to a high frequency audio signal at the speaker 168 which is received by the microphone 166 and decoded. Of course the transmitter can transmit other forms of radiation, for example it can be an optical or microwave transmitter with a suitable receiver being provided on the personal computer.

Where the transmitter is optically based it can utilise IRDA (infrared) standard communications implementation as will be known to the skilled person and as currently available on many "laptop" computers. The optical transmission can be at the "blink" (repetition) frequency of the pen illumination source.

Figure 8:
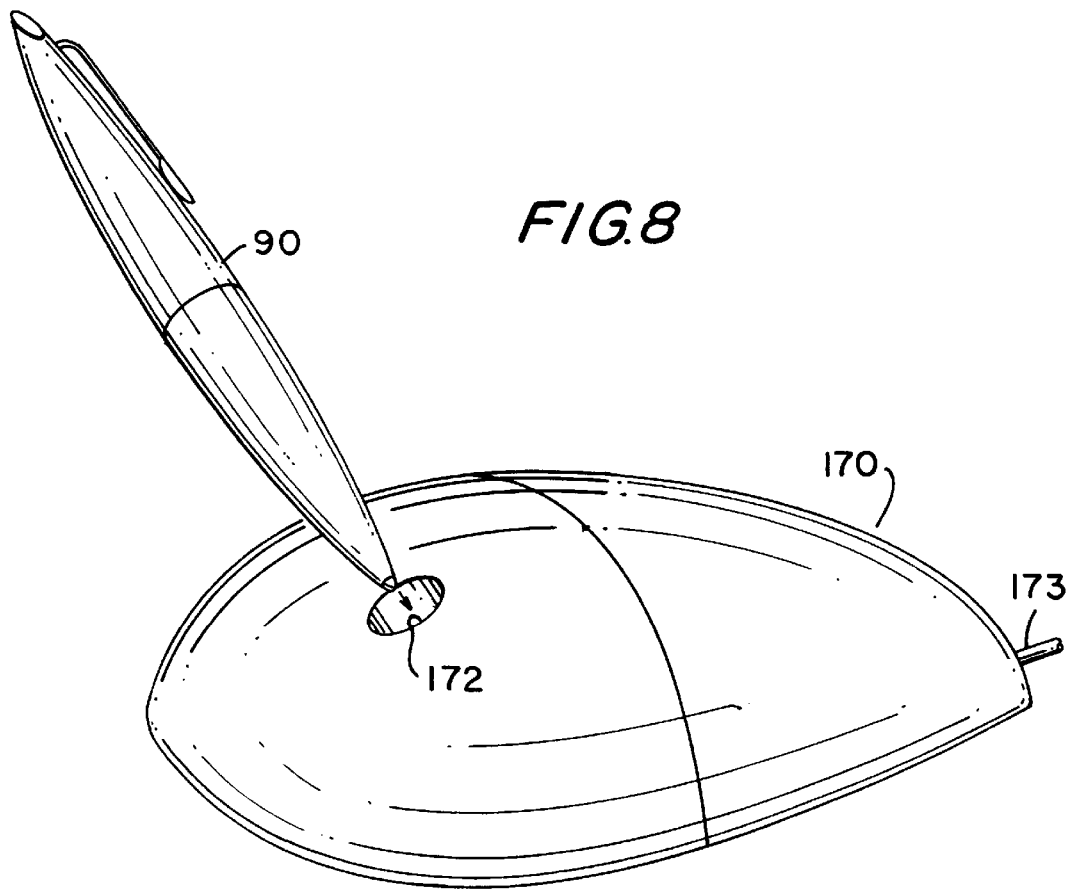
FIG. 8 shows a dedicated down-loading port from the pen-type optical reader according to the present invention.

Yet a further down-loading system is shown in FIG. 8. A dedicated data down-loading port 170 includes an orifice 172 for receiving a reader wand 90. The port 170 communicates information down-loaded from the wand reader 90 via a line 174. Referring to the sectional view shown in FIG. 9, it will be seen that the port 170 includes a data receiving interface 174 of any of the types described above which communicates with the reader wand 90 for down-loading of information. Down-loading can be contact activated by contact between the wand reader 90 and the interface 174 or activated by pushing a button or other switch (not shown) on the wand reader. The interface 174 communicates with a processor 176 for converting the down-loaded information if necessary into a format appropriate for a computer network, and the information is communicated to the computer network via line 173.

It will be appreciated that line 173 can comprise a wireless link or a telephone line, in which case an appropriate modem can form part of the port 170.

Figure 9:
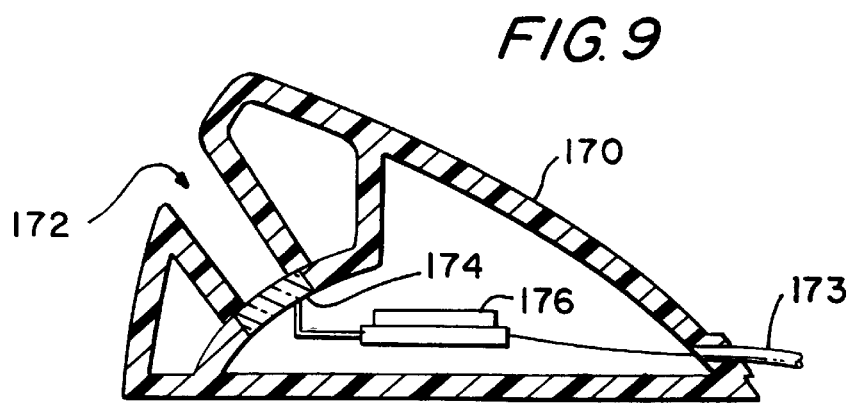
FIG. 9 is a section view of the down-loading port shown in FIG. 8.

It will be seen that all of these methods comprise a user-friendly system for down-loading scanned information from a wand reader. Use of a data well-type port of the type shown in FIGS. 8 and 9 is particularly suitable where it is not desired to rely on the consumer having a PC or other home access to a suitable computer network. The port can for example be provided at a retail outlet or other point of sale. It should be noted that the wand reader can also be writable via the data port, personal computer or other means (even a bar code symbol itself) to input user information of the type discussed above. This would facilitate short term usage of a wand reader allowing a given user to input information temporarily for the duration of his or her use of the wand reader.

The range of applications of the system as a whole is evidently very wide. For example a consumer could use the wand reader while on an airplane or in other areas where access to the Internet or appropriate computer network was not immediately available. In addition to the applications described above, the system could be used to store and access information concerning items in many other applications, for example in warehouse storage systems.

Turning once again to the wand reader itself it will be seen that a problem that arises in use is that the user may swipe or scan the wand reader across a bar code at a non-constant speed. This will particularly be a problem for a fixed field of view reader as the width of a bar read by the reader in the time domain will be dependent upon the speed at which the reader is swiped. This is exacerbated if the wand reader is not scanned at a constant speed as will often be the case with inexperienced users.

Various methods can be used to overcome this problem. For example the wand reader can be designed for contact with the page on which the bar code symbol is printed. In that case a roller element can be incorporated at the tip of the wand reader. The roller, as it rolls across the paper while the bar code symbol is being read, records the instantaneous velocity of the wand reader across the paper at any point. The bar code symbol as read in the time domain by the wand reader can thus be accurately decoded as the actual spatial width of the bars and symbols can be calculated from the product of the time taken to traverse a given bar or space and the speed of the wand reader whilst traversing the bar or space. A similar calculation can be used in an alternative system where, instead of a tip roller, a bar code symbol having a reference line of dots or lines running parallel with the bar code symbol itself and having known spacing is provided. The speed of the wand reader can, therefore, be determined from the time taken traversing adjacent points in the reference line and calculating the instantaneous velocity based on the known distance between the points.

It will be appreciated, however, that it is desired to be able to cater for user determined scanning speed, or variations in scanning speed, without requiring the additional parts and complexity of a roller system, and without requiring the bar code to include a reference line when printed.

Figure 10:
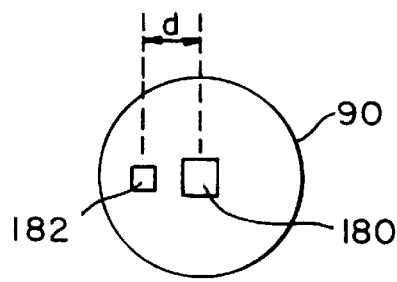
FIG. 10 is a front-end view of a pen-type optical reader including a scanning speed sensor.
Figure 11A:
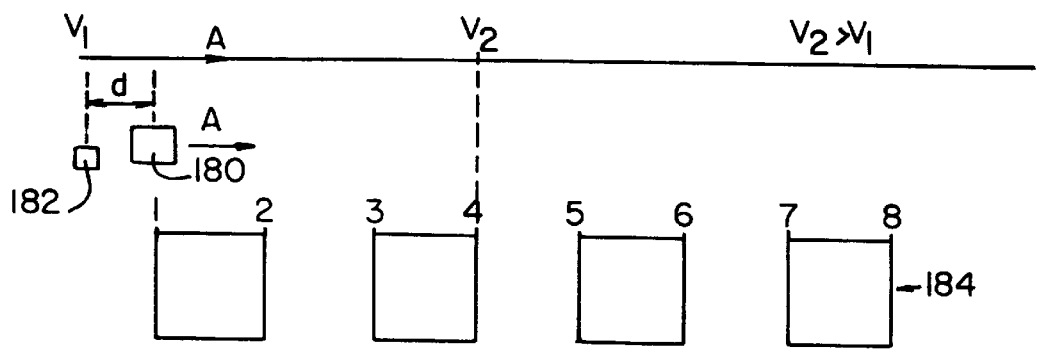
FIG. 11a shows an exemplary bar code symbol to be scanned.
Figure 11B:
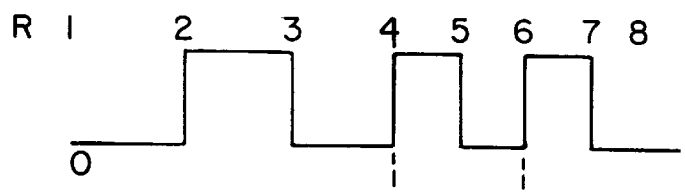
FIG. 11b shows the detected reading by a principal sensor.
Figure 11C:
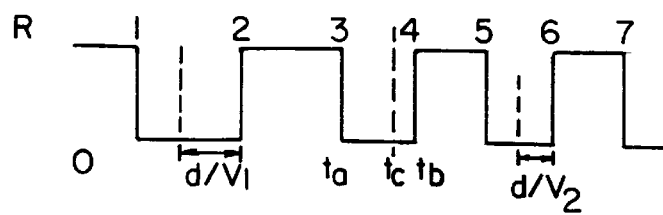
FIG. 11c shows a detected reading by a subsidiary sensor.

A wand reader adapted to overcome these problems is shown in FIG. 10. As seen from a view of its scanning end the wand reader 90 includes a principal reader point 180 and a second reading point 182. The reading points 180,182 are separated by a known distance D. Referring to FIGS. 11a to 11c, when a bar code symbol having for the purposes of illustration the simple configuration shown at 184 is read by the wand reader the reflectivity readings in the time domain taken by each of the reader points 180,182 are shown at 186,188 respectively. The time lag between the readings 186,188 resulting from the spacing between the reading points 180,182 is evident.

Readings 186,188, are scaled in the time domain to match the spacing in the bar code symbol 184 at a first speed $V_1$ for the purposes of clarity.

The wand reader 90 is scanned across the bar code symbol 184 in the direction shown as A. The transition points between bars and spaces on the bar code symbol 184 are numbered 1,2,3 . . . 8. As an illustrative example the wand reader 90 is scanned at a first speed $V_1$ across points 1, 2 and 3 but, at point 4, the scanning speed changes to $V_2$ where, again for the purposes of illustration $V_2 > V_1$.

The spaced reading points 180,182 are shown in their relative positions traversing bar code symbol 184. The reflectivity reading for the principal reading point 180, which traverses the bar code first is shown at 186. As will be seen, the duration between each of the transition points 1,2,3,4 is constant corresponding to constant speed $V_1$. The duration across transition points 4,5,6,7 is also constant but shorter than that for transition points 1,2,3,4 because the wand reader is scanned across the symbol 184 at a higher speed $V_2$.

In order to obtain additional information it will be seen that the reflectivity reading for the second reading point 182 is also required. The reflectivity reading 188 for the second point 182 also displays constant duration between transition points 1,2,3 but lags in time behind the reading 186 for the principal point 180 because the second point 182 is physically behind the main point 180, spaced by distance D. The time lag is given by the equation $D/V_1$. Accordingly, as D is a known constant and the time lag can be calculated from a comparison of the two readings 186,188, $V_1$ can be calculated simply. It will be seen that in order to carry out the calculation it is necessary to be able to match up corresponding points on each of the readings 186,188. This can be achieved easily once a first common point has been identified for each of the readings 186,188. After that—of course assuming no reading errors—the subsequent transition points can be easily matched. Indeed where there is no change in speed during the scan no further calculation is required. The time lags between subsequent corresponding points on each reading 186,188 can be checked to verify that the speed remains constant.

Further calculation steps are required if it transpires that the speed changes during the scan. For example where, as the principal reading point passes transition point 4 on the bar code symbol 184 the speed increases to $V_2$, the duration between adjacent transition points will decrease for each reading 186,188. If the time lag between corresponding transition points subsequent to the change of speed is measured, once again the new speed can be established, given that the time lag=$D/V_2$ (as shown for transition point 6).

Figure 11D:
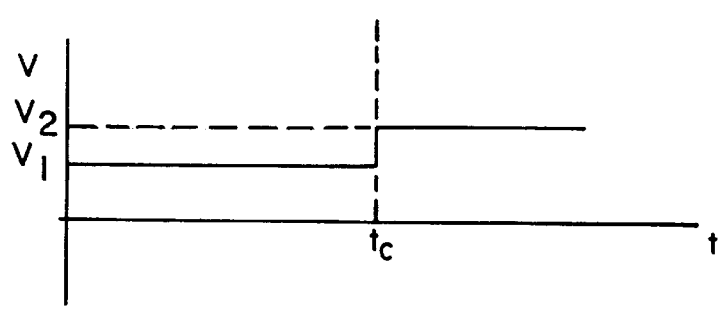
FIG. 11d is a graph showing scanning speed variation against time.

It will be appreciated that to obtain the most information it is desirable to know the point in time at which the speed changes. In the example shown, comparison of the respective durations between corresponding adjacent transition points on each of the readings 186,188 shows that the speed change must have occurred while the second reading point 182 was between transition points 3 and 4, as the time taken for the second reading point 182 to traverse the points is shorter than that for the principal reading point 180. In fact the exact point in time can be calculated, referring to reading 188, using the following equation where $t_c$ is the point at which the velocity changes:

$$(t_c - t_a) \cdot v_1 + (t_b - t_c) \cdot v_2 = t_b - t_a$$

$$t_c = \frac{t_a(v_1 - 1) + t_b(1 - v_2)}{(v_1 - v_2)}$$

where $t_a$ is the time at transition point 3 and $t_b$ is the time at transition point 4, and $v_1$ and $v_2$ are calculated as described above. It will be seen, therefore, that the speed against time diagram shown in FIG. 11d can be constructed. This allows accurate calculation of the actual spacing of the various transition points of the bar code symbol 184 in conjunction with the reading 186 taken by the principal reading point 180.

Figure 12:
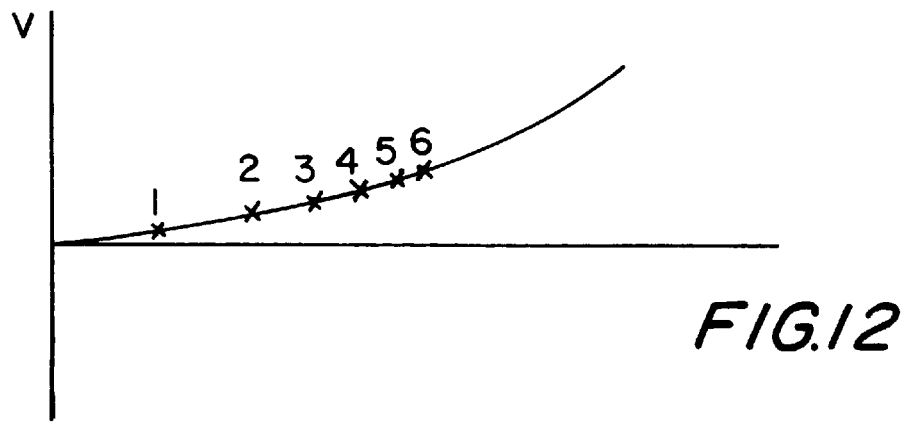
FIG. 12 shows an alternative graph of scanning speed variation against time.

It will be appreciated that the above discussion draws a useful guideline based on a rather idealized velocity variation. In practice, of course, it is likely that the speed will vary as some form of continuous curve. In that case the maximum information that can be obtained will be from measuring the time lag between the two reading points 180,182 passing each transition point. The speed at each transition point can thus be determined taking into account the known spacing between the reading points 180,182 as discussed above. This will give rise to a discrete set of measured velocity values for given times t as illustrated in FIG. 12. The transition point corresponding to each measurement point is numbered 1,2,3 . . . corresponding to the numbering in FIG. 11. It will be seen that, in the illustrated example, the speed plot curves upwardly indicating acceleration. The points at which the readings are plotted along the time axis will move closer together as the scanning speed increases.

The instantaneous speed information can only be derived for each of the recognizable transition points. If desired, or possible, recognizable printing defects detected in each of the readings 186,188 could be used to provide extra measurement points.

Two principal difficulties are identified with the system and solved as discussed below.

Firstly, information as to the instantaneous speed between transition points cannot be determined exactly. However a curve can be extrapolated between the measurement points which will give an accurate indication of the scanning speed of the wand reader at any point in time. The extrapolation process can be improved taking into account information stored as to typical scanning speed curves for users. This information could be used to determine the most likely curve followed between determined measurement points.

In addition variations in scanning speed in the period between each of the reading points passing the same transition point will not be detected. Accordingly the speed measured at each transition point can be no more than an average value. This is most simply overcome by ensuring that the spacing between the windows 180,182 is as small as possible such that only a very short lag period is available in which the scanning speed can change.

A further factor that must be taken into account is that the orientation of the wand reader will influence the readings and calculations. In particular the spacing between the reading points 180,182 in the scanning direction will depend on the orientation of the wand reader. Various possibilities are available to overcome this problem. First of all the wand reader can be shaped such that it can be held only in one way by the user such that the reading orientation is known. There is no guarantee, however, that the user will not somehow hold the wand reader incorrectly. Problems also arise as regards whether the user is left or right handed.

Figure 13:
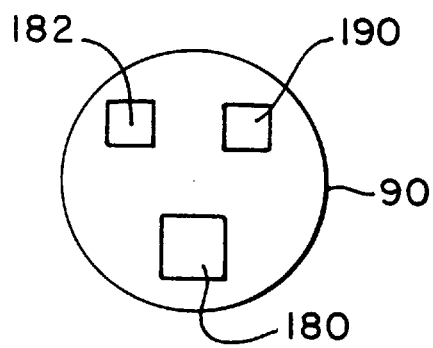
FIG. 13 shows an alternative configuration for the pen-type optical reader of FIG. 10.
Figure 14:
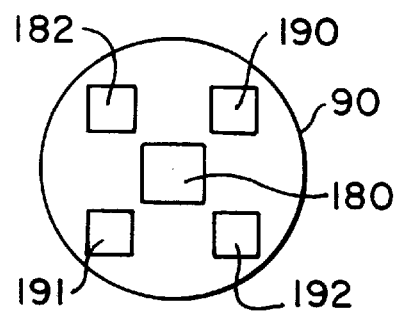
FIG. 14 shows an alternative configuration for the pen-type optical reader of FIG. 10.
Figure 15:
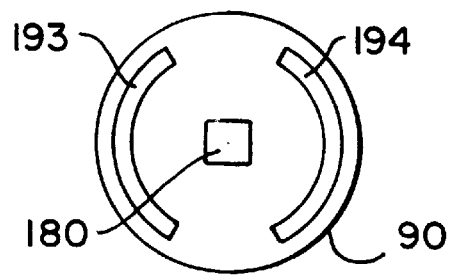
FIG. 15 shows an alternative configuration for the pen-type optical reader of FIG. 10.

A preferred solution is to provide sufficient reading points to allow the orientation to be determined. For example, as shown in FIG. 13 a principal reading point 180 and second and third reading points 182,190 are also provided, each at a corner of a nominal triangle of known dimension. In that case three reflectivity readings will be obtained, giving three time lag values for a corresponding transition point on each of the readings. From this information the instantaneous speed, the spacing between the reading points 180,182 and 190 in the reading direction and hence the orientation of the wand reader 90 can be determined. An alternative configuration shown in FIG. 14 in which the principal reading point 180 is used for basic bar coding reading and four additional points 182,190,191,192 provide the desired speed and orientation information. A further variant is shown in FIG. 15 which a pair of opposing elongate, arcuate additional reading zones 193,194 are provided, allowing speed and orientation information for decoding the reading taken by a principal reading point 180.

Using the system above, the measurement of the scanning speed is simply and accurately achieved, and variations in the scanning speed can be measured. Indeed variations in scan speed from 5 inches per second to 25 inches per second can generally be detected and provided for without difficulty.

It will be seen that additional information processing will be required to ascertain the speed information, but a further advantage of the proposed implementation is that the simple time domain data for each reading window can be stored in the wand reader and down-loaded to a personal computer or other processor. At that stage the additional processing steps and complete decode can be carried out. As a result the power, processing and memory burden on the wand reader is minimised.

It will be seen that the above teachings relate to any scanner type suitable for hand-held scanning and being essentially portable, capable of reading a bar code symbol or similar information carrying symbol. The information can be down-loaded from memory in the hand-held scanner by means of any suitable interface to a personal computer or other access point or computer network, and corresponding information called up from an web site or corresponding main memory location.

Without further analysis, the foregoing will so filly reveal the gist of the present invention that others can readily adapt to various applications without omitting features that, of the standpoint of prior art, fairly constitute essential characteristics of the generic or specific aspects of the invention and, therefore, such adaptions should and are intended to be compounded within the meaning and range of equivalents of the following claims.

What is claimed is:

1. A portable, dual-use instrument for marking surfaces by a user, and for electro-optically collecting data selected by the user, for subsequent downloading, comprising:
    a) a narrow, elongated housing extending along an axis between opposite end regions, and having a size and shape configured to be held by and among fingers of a single hand of the user during both marking and data collection;
    b) a marking implement supported by the housing and having a marker at one of the end regions of the housing and facing a surface to be marked during marking; and
    c) a data collector supported by the housing and having a light-transmissive window at another of the end regions of the housing and facing a bar code symbol during data collection, the data collector including a light source operative for directing a light beam through the window to the symbol for reflection therefrom, a light sensor having a field of view and operative for detecting light reflected off the symbol through the window and generating an electrical signal indicative of the detected light, a processor for processing the electrical signal into a processed signal, and a memory for storing the processed signal corresponding to the data selected by the user, and for storing user information uniquely identifying the user who selected the data, for subsequent downloading.

2. The instrument of claim 1, wherein the housing bounds an interior in which the data collector is accommodated, and wherein the housing has separable portions which, upon separation, enable access to the interior.

3. The instrument of claim 2, wherein the housing has an exterior clip for clipping the housing to a part of the user's clothing.

4. The instrument of claim 2, wherein the marking implement includes a fluid cartridge having a nib, and a mechanism for retracting the nib within the housing, and for exposing the nib as the marker during marking.

5. The instrument of claim 1, wherein the data collector includes a scanner for scanning at least one of the light beam and the field of view.

6. The instrument of claim 5, wherein the data collector includes a manually actuatable trigger on the housing for initiating scanning.

7. The instrument of claim 1, wherein the window lies in a plane that is generally perpendicular to the axis.

8. The instrument of claim 1, wherein the window lies in a plane that is inclined at an angle to the axis.

9. The instrument of claim 1, wherein the user information includes a billing number for the user.

10. The instrument of claim 1, wherein the user information includes a billing address for the user.

11. A system for electro-optically collecting and downloading data, and for retrieving information based on the data, comprising:
    a) a portable, dual-use instrument for marking surfaces by a user, and for electro-optically collecting data selected by the user, including
        i) a narrow, elongated housing extending along an axis between opposite end regions, and having a size and shape configured to be held by and among fingers of a single hand of the user during both marking and data collection;
        ii) a marking implement supported by the housing and having a marker at one of the end regions of the housing and facing a surface to be marked during marking; and
        iii) a data collector supported by the housing and having a light-transmissive window at another of the end regions of the housing and facing a bar code symbol during data collection, the data collector including a light source operative for directing a light beam through the window to the symbol for reflection therefrom, a light sensor having a field of view and operative for detecting light reflected off the symbol through the window and generating an electrical signal indicative of the detected light, a processor for processing the electrical signal into a processed signal, and a memory for storing the processed signal corresponding to the data selected by the user, and for storing user information uniquely identifying the user who selected the data; and
    b) a download port bounding a cavity having a size and shape configured to receive the other of the end regions of the housing during downloading of the processed signal and the user information stored in the memory of the data collector for developing a unique user profile.

12. The system of claim 11, wherein the housing bounds an interior in which the data collector is accommodated, and wherein the housing has separable portions which, upon separation, enable access to the interior.

13. The system of claim 12, wherein the housing has an exterior clip for clipping the housing to a part of the user's clothing.

14. The system of claim 12, wherein the marking implement includes a fluid cartridge having a nib, and a mechanism for retracting the nib within the housing, and for exposing the nib as the marker during marking.

15. The system of claim 11, wherein the data collector includes a scanner for scanning at least one of the light beam and the field of view.

16. The system of claim 15, wherein the data collector includes a manually actuatable trigger on the housing for initiating scanning.

17. The system of claim 11, wherein the window lies in a plane that is generally perpendicular to the axis.

18. The system of claim 11, wherein the window lies in a plane that is inclined at an angle to the axis.

19. The system of claim 11, wherein the system includes a desk-top computer on which the download port is located.

20. The system of claim 11, wherein the system includes a lap-top computer on which the download port is located.

21. The system of claim 11, wherein the system includes a peripheral module on which the download port is located, the module having a generally planar base for supporting the module on a generally planar support surface.

22. The system of claim 21, wherein the cavity extends along a port axis that is inclined relative to the base.

23. The system of claim 11, wherein the download port is in electrical communication with a global computer network having a server on which information relating to the data is stored, and wherein the server is operative for delivering the information.

24. The system of claim 23, wherein the network includes a display, and wherein the server delivers the information by displaying the information on the display.

25. The system of claim 11, wherein the user information includes a billing number for the user.

26. The system of claim 11, wherein the user information includes a billing address for the user.

27. A method of electro-optically collecting and downloading data, and of retrieving information based on the data, comprising the steps of:

a) providing a user with a portable, dual-use instrument for marking surfaces by the user, and for electro-optically collecting data selected by the user, the instrument being sized and shaped to be carried by the user;

b) marking a surface to be marked with a marker on the instrument by holding the instrument by and among fingers of a single hand of the user;

c) electro-optically collecting data by holding the instrument by and among the user's fingers, and by directing a light beam at a bar code symbol, by detecting light reflected off the symbol, by generating an electrical signal indicative of the detected light, by processing the electrical signal into a processed signal, and by storing the processed signal and user information uniquely identifying the user on-board the instrument;

d) downloading the stored signal and the stored user information to a server having the information to be retrieved, by having the user insert a part of the instrument into a download port; and e) retrieving and displaying the information to the user.

28. The method of claim 27, wherein the marking step is performed by marking the surface with a fluid.

29. The method of claim 27, wherein the collecting step is performed by scanning at least one of the light beam and a field of view across the symbol.

30. The method of claim 27, wherein the downloading step is performed by inserting the instrument part into a cavity in a desk-top computer.

31. The method of claim 27, wherein the downloading step is performed by inserting the instrument part into a cavity in a lap-top computer.

32. The method of claim 27, wherein the downloading step is performed by inserting the instrument part into a cavity in a peripheral module in electrical communication with the server.

33. The method of claim 27, wherein the user data storing step is performed by storing a billing number for the user.

34. The method of claim 27, wherein the user data storing step is performed by storing a billing address for the user.

* * * * *